United States Patent [19]

Konrad et al.

[11] Patent Number: 4,538,715
[45] Date of Patent: Sep. 3, 1985

[54] OVERLOAD CLUTCH WITH VIBRATION PROTECTION MECHANISM

[75] Inventors: Mathias Konrad, Troisdorf; Klaus Kämpf, Lohmar, both of Fed. Rep. of Germany

[73] Assignee: Jean Walterscheid GmbH, Lohmar, Fed. Rep. of Germany

[21] Appl. No.: 451,002

[22] Filed: Dec. 20, 1982

[30] Foreign Application Priority Data

Dec. 24, 1981 [DE] Fed. Rep. of Germany ....... 3151485

[51] Int. Cl.³ .................. F16D 7/02; F16D 43/20
[52] U.S. Cl. ................. 192/56 R; 192/89 A; 192/114 R; 464/38
[58] Field of Search .............. 192/56 R, 89 A, 114 R; 464/38, 36

[56] References Cited

U.S. PATENT DOCUMENTS

| | | | |
|---|---|---|---|
| 2,775,327 | 12/1956 | Gearhart | 192/56 R |
| 3,774,738 | 11/1973 | Steinhagen | 192/56 R |
| 3,893,553 | 7/1975 | Hansen | 192/56 R |
| 4,075,873 | 2/1978 | Geisthoff | 192/56 R |
| 4,187,938 | 2/1980 | Miller | 464/36 X |
| 4,255,946 | 3/1981 | Hansen | 464/36 |
| 4,294,340 | 10/1981 | Kunze | 192/56 R |

FOREIGN PATENT DOCUMENTS

| | | | |
|---|---|---|---|
| 0564273 | 2/1958 | Belgium | 192/56 R |
| 2853293 | 12/1980 | Fed. Rep. of Germany. | |
| 0846862 | 7/1981 | U.S.S.R. | 464/36 |

*Primary Examiner*—Rodney H. Bonck
*Assistant Examiner*—David D. House
*Attorney, Agent, or Firm*—Toren, McGeady, Stanger, Goldberg & Kiel

[57] ABSTRACT

An overload clutch which is prevented from unintentionally switching into the freewheeling position when rotational vibrations occur includes torque-transmitting members held in apertures of a first clutch member and adapted to be engaged in first recesses of a second clutch member for bringing the clutch into torque-transmitting engagement. A switching ring includes second recesses adapted to align with the apertures in the first clutch member when an overload condition occurs. A circumferentially acting spring tends to hold the switching ring in the torque-transmitting position and a securing pin is mounted in the first clutch member for engagement in a detent in the switching ring to hold the switching ring in torque-transmitting position. The securing pin is held in engagement with the detent by a spring but is arranged so as to extend into the detent a distance which will permit disengagement of the securing pin when a predetermined nominal torque of the clutch is exceeded.

2 Claims, 4 Drawing Figures

OVERLOAD CLUTCH WITH VIBRATION PROTECTION MECHANISM

The present invention relates generally to an overload clutch for protecting drive lines and particularly to a clutch which will avoid undesirable disengagement into the free-wheeling position as a result of rotational vibrations and the like.

A clutch of the type to which the present invention relates includes a first and a second member adapted to be placed in driving engagement with each other with one of the members being designed, for example, as a clutch hub and having circumferentially distributed apertures within which torque-transmitting rolling members are held which engage into recesses formed in the second clutch member. A switching ring is provided with recesses corresponding to the recesses of the second clutch member, the switching ring being held in the torque-transmitting position so as to be angularly offset relative to the second clutch member by springs acting in the circumferential direction. The torque-transmitting members are supported in the torque-transmitting position through the switching ring by axial spring means held between a pair of stops and with the switching ring being rotatable if predetermined nominal torque is exceeded against the force of the circumferentially acting ring as a result of rolling movement of the driving members in such a way that the recesses of the switching ring can be brought into corresponding angular position relative to the apertures of the first clutch member.

An overload clutch of the prior art is known from U.S. Pat. No. 4,294,340. In this overload clutch, after nominal torque is exceeded and after the clutch has switched into the freewheeling position, the clutch will rotate with a greatly reduced ratchet moment and it can be switched back into the torque-transmitting position simply by reducing the driving speed. In the case of such an overload clutch, balls serving as the driving members are held in apertures of a flanged extension of the clutch hub and in the torque-transmitting position the balls engage into recesses of the other clutch part. In the case of overloading, the balls emerge rotatively from the recesses of the other clutch part with the rotating movement being transferred to a switching ring which is rotatable in the circumferential direction against a spring and which rotates in such a way that further recesses provided in the switching ring are turned toward the balls so that they can fall into these recesses of the switching ring. The spring which as a result is pretensioned in the circumferential direction provides the low ratchet moment which occurs when the overload clutch is in the freewheeling position and which permits the clutch to become re-engaged.

The disadvantage of such a design is that when rotational vibrations superimposed on the rotational movement and the resultant transient zero loads occur, an unintentional freewheeling of the overload clutch occurs without the predetermined nominal torque having been reached or exceeded. This unintentional freewheeling of the overload clutch causes undesired interruptions in power transmission and in continuation of the working process.

Accordingly, the present invention is directed toward provision of an overload clutch which will operate independently of the occurrence of rotational vibrations and which will not freewheel until a predetermined nominal torque has been exceeded, with the ratchet moment required for re-engaging the clutch from the freewheeling position being maintained at a relatively low level.

SUMMARY OF THE INVENTION

Briefly, the present invention may be described as an overload clutch for protecting drive lines comprising: a first clutch member and a second clutch member adapted to be placed in driving engagement with each other; aperture means in said first clutch member; first recess means circumferentially distributed in said second clutch member; rolling members held in said aperture means and adapted to be engaged in said first recess means for placing said first and second clutch members in torque-transmitting engagement; a switching ring having therein second recess means corresponding to said first recess means and angularly offset relative thereto when said clutch is in torque-transmitting engagement; circumferentially acting spring means holding said switching ring in said angularly offset position; axial spring means acting against said switching ring to urge said rolling members into torque transmitting engagement within said first recess means; said switching ring being rotatable against the force of said circumferentially acting spring means when a predetermined nominal torque of said clutch is exceeded to bring said second recess means in corresponding angular position relative to said aperture means; securing pin means mounted in said first clutch member so as to be axially movable relative thereto to a limited extent; detent means formed in said switching ring engaging therein said securing pin means when said clutch is in torque-transmitting engagement; and spring means urging said securing pin means into engagement within said detent means; said securing pin means protruding into said detent means a distance smaller than the maximum depth of said second recess means to enable said securing pin means to be disengaged therefrom when nominal clutch torque is exceeded.

Thus, in accordance with the present invention the objectives thereof are achieved in that the first clutch member which is designed as the clutch hub has therein at least one securing pin which is guided so as to be axially movable to a limited extent. The securing pin, on the side facing the switching ring, is held by the force of a spring so as to project from the clutch hub. The switching ring is provided with a detent corresponding to the securing pin in the torque transmitting position and the length of the securing pin protruding into the switching ring is smaller than the maximum depth of the recesses in the second clutch member.

The advantage of a design in accordance with the invention is that even if rotational vibrations are superimposed on the rotaty movement of the clutch members, the torque-transmitting position will be maintained until the actual torque exceeds the predetermined nominal torque. The advantageous possibility of re-engaging the overload clutch from the freewheeling position into the torque-transmitting position by simply decreasing the driving speed is not adversely affected by the measures of the invention.

Insensitivity against rotational vibrations is particularly advantageous if the overload clutch is used in drive lines arranged between a tractor and an agricultural implement since the drive shafts used in such applications because of a small amount of space available are articulated to a considerable extent. The rotational vibrations occurring in such cases are accommodated by the overload clutch in accordance with the invention without undesired engagement or disengagement occurring.

However, the use of the overload clutch is not restricted to the application described, but is recommended in other applications where rotational vibrations occur in drive lines which are to be protected from overloading.

In a further embodiment of the invention, the width of the detent taken in the circumferential direction of the clutch is made greater than the diameter of the securing pins protruding into the detent. As a result of this measure, perfect rolling of the balls serving as the driving members over the entire switching range from the torque-transmitting position to the freewheeling position is ensured. If, as a result of load values exceeding the nominal torque, the switching ring is turned to such an extent that the play of the securing pin in the recess is exhausted, the pressure built up by the driving members and applied to the switching ring will be so high that unintentional freewheeling will be prevented.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in where there is illustrated and described a preferred embodiment of the invention.

DETAILED DESCRIPTION OF THE PREFERRED EMBODIMENT

Figure 1:
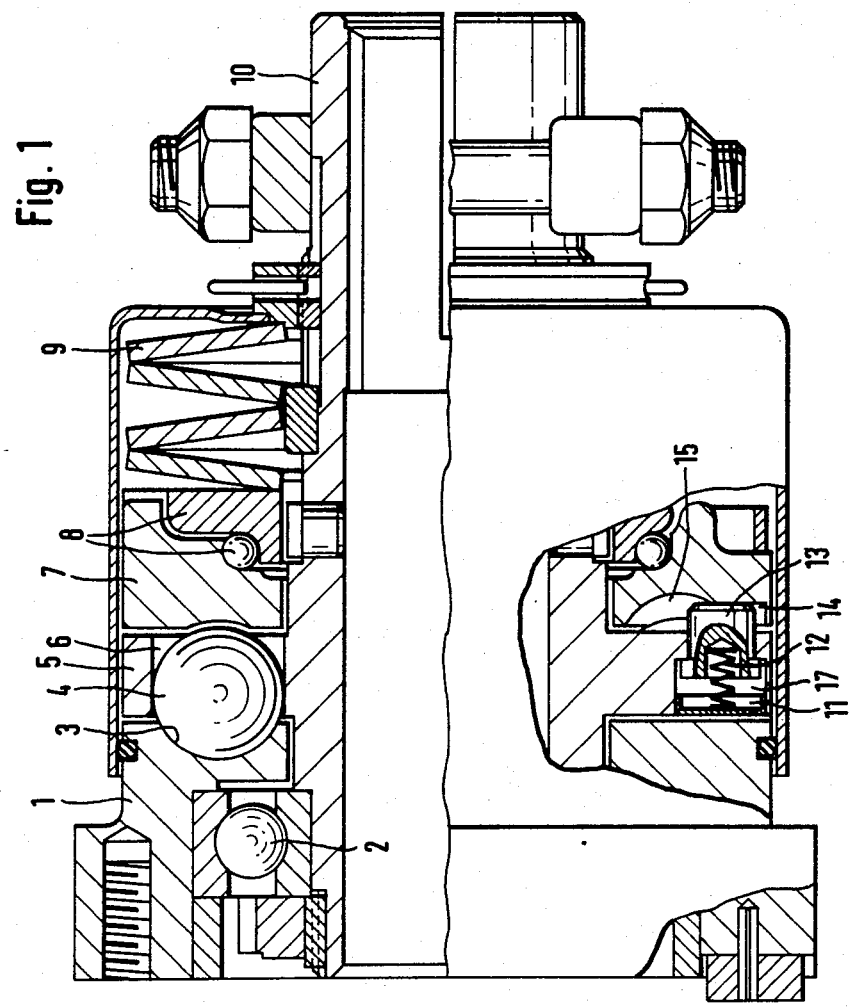
FIG. 1 is a longitudinal sectional view showing an overload clutch in accordance with the present invention.

Referring now to the drawings, an overload clutch in accordance with the invention is shown in FIG. 1 as consisting essentially of a clutch hub 10 upon which a driving flange 1 is supported by means of a bearing 2. The clutch hub 10 may be considered a first clutch member and the driving flange 1 a second clutch member, these members being adapted to be placed in torque-transmitting engagment by driving members 4 which are formed in the shape of rotating balls.

The clutch hub 10 is provided with a flange extension 5 within which there are provided apertures 6 in which the driving members 4 are held. In the torque-transmitting position of the driving members 4, the driving members 4 engage into recesses 3 of the driving flange 1. Thus, the driving members 4 will connect in torque-transmitting engagement the driving flange 1 and the clutch hub 10.

At the end away from the driving flange 1, the driving members 4 support themselves upon a switching ring 7 which is supported against an axially acting spring washer 9 through a bearing 8, the spring 9 determining the transferable torque of the clutch.

When a predetermined nominal torque is exceeded, the driving flange 1 will be braked and the driving members 4 will rotatively emerge from the recesses 3 of the driving flange 1. At the same time, the switching ring 7 as a result of the rotational movement of the driving members 4 will be turned against the force of a circumferentially acting spring 16 to such an extent that recesses 15 formed in the switching ring 7 will be brought into relative alignment with the apertures 6 of the flange extension 5 of the clutch hub 10. As a result, the driving members 4 will fall into the recesses 15 and the clutch will then be brought into the freewheeling position.

The relieved length of the spring washer 9 is designed in such a manner that after the driving members 4 have fallen into the recesses 15 of the switching ring 7, the spring washer 9 cannot introduce any standard force into the clutch. This arrangement permits easy re-engagement of the overload clutch into the torque-transmitting position.

The ratchet moment required for automatic re-engagement of the clutch after switching into the freewheeling position is provided merely by the spring 16 which acts in the circumferential direction on the switching ring 7.

Whether the clutch is in the torque-transmitting position or even if torque transmission is not occurring, the spring washer 9 cannot introduce a standard force into the clutch and the switching ring 7 via the bearing 8 supports itself against the spring washer 9 only when there is torque to be transmitted. The switching ring 7 even with zero conditions of load moment is held only by the spring 16 acting in the circumferential direction on the switching ring 7. As in this case, the switching ring 7 is induced by the rotational vibrations to produce internal vibrations, unintentional switching into the freewheeling position of the overload clutch could occur if the safeguards in accordance with the present invention were not provided.

The safeguards in accordance with the present invention are shown in the lower half of FIG. 1 wherein partially sectioned parts are depicted. The safeguards of the invention include a securing pin 13 which is supported within an aperture 17 designed as a stepped bore located in the flange extension 5 of the clutch hub 10. The securing pin 13 is held by the force of a spring 12 and is urged toward the switching ring 7 in a position where it will project axially from the flange extension 5. At its end opposite the pin 13, the spring 12 is supported on a supporting plate 11 which is supported within the flange extension 5.

The securing pin 13 is adapted to engage within a detent 14 formed in the switching ring 7. The engagement of the securing pin 13 within the detent 14 is shown in FIG. 3 and with the pin 13 engaged in the detent 14, this engagement will tend to prevent switching of the clutch into the free-wheeling position when overload has not occurred.

Figure 2:
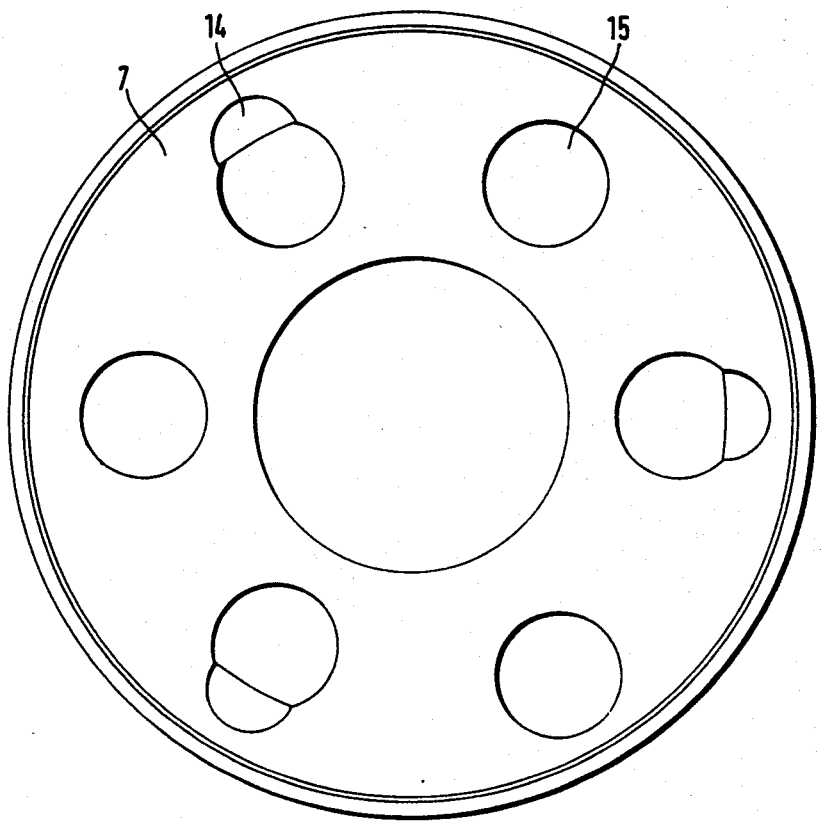
FIG. 2 is a plan view illustrating a switching ring in accordance with the invention.

FIG. 2 illustrates in plan view the switching ring 7 showing more clearly the arrangement of the detents 14 relative to the recesses 15.

Figure 3:
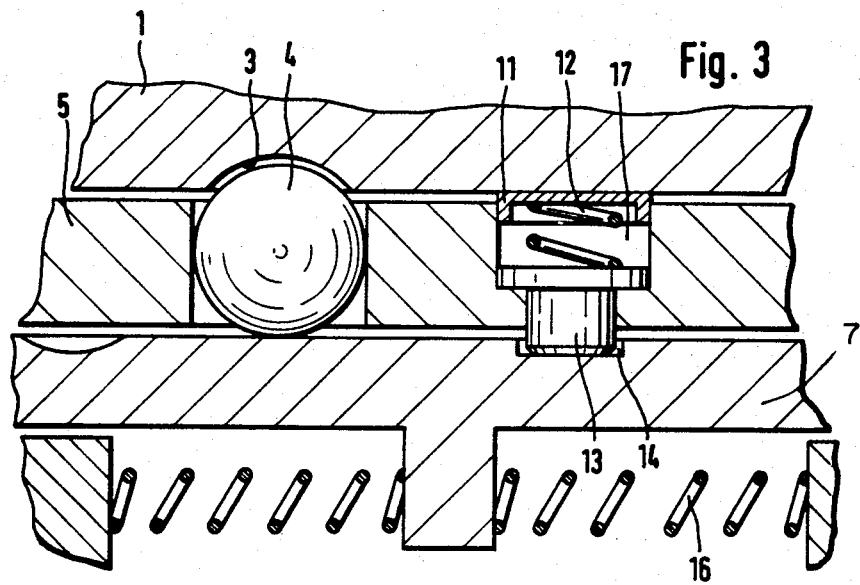
FIGS. 3 and 4 are transverse sectional views showing important components of the overload clutch with FIG. 3 depicting the torque-transmitting position and FIG. 4 depicting the freewheeling position.

The partial sectional view of FIG. 3 shows the overload clutch in the torque-transmitting position. The driving members 4 are held in the recesses 3 of the driving flange 1 and the securing pin 13 engages within the detent 14 in the switching ring 7 and holds the switching ring 7 against rotation against the force of the circumferential spring 16 even though rotational vibrations may occur.

Figure 4:
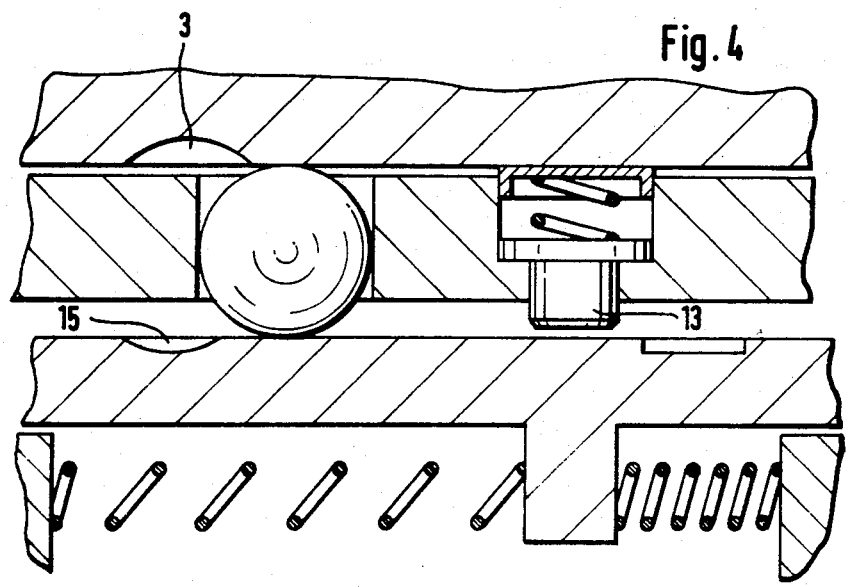

When overloading occurs due to the clutch exceeding its nominal torque requirements, the driving members 4 will roll out of the recesses 3 of the driving flange 1 and turn the switching ring 7 relative to the flanged extension 5 of the clutch hub 10. At the same time, the switching ring 7 will be lifted from the flange extension 5 and the securing pin 13 will become disengaged from the recess 14 of the switching ring 7. This will bring about the clutch free-wheeling or disengaged condition and this condition is illustrated in FIG. 4. As a result, the overload clutch will be free to switch into the free-wheeling position and torque transmission will no longer occur.

Thus, as a result of the features of the present invention, the object of the present invention will be achieved in that the overload clutch will be protected from unintentional switching into the freewheeling position when rotational vibrations occur.

In overload clutches known in the prior art, when switching from the torque-transmitting position to the free-wheeling position occurs by rotation of the switching ring 7 moving against the force of a circumferential spring, where the switching ring 7 when the overload clutch is not torque-loaded is held in position exclusively by the force of the circumferential spring, there occurs a risk in the case of rotational vibrations and related transient zero conditions of the rotational load that the clutch will switch into the freewheeling position unintentionally.

In order to prevent this, the invention provides for the clutch hub 10 to hold in an axially movable way a securing pin 13 which is held by a spring 12 so as to protrude from the clutch hub 10 at the end facing the switching ring 7 and to engage in a detent 14 provided in the switching ring 7. If rotational vibrations occur, the torque-transmitting position of the overload clutch is held by the securing pin 13 which, however, in the case of torque exceeding the predetermined nominal value and any related axial movement of the switching ring, will release the latter.

The securing pin 13 is mounted in the flange extension 5 so as to be axially movable to a limited extent. The unit is designed so that the length of the securing pin 13 protruding into the detent 14 of the switching ring 7 is smaller than the maximum depth of the recesses 3 in the driving flange 1.

Furthermore, the width of the detent 14 taken in the circumferential direction is made greater than the diameteter of the securing pin 3 protruding into the detent 14.

While a specific embodiment of the invention has been shown and described in detail to illustrate the application of the inventive principles, it will be understood that the invention may be embodied otherwise without departing from such principles.

What is claimed is:

1. An overload clutch for protecting drive lines comprising: a first clutch member and a second clutch member adapted to be placed in driving engagement with each other; aperture means in said first clutch member; first recess means circumferentially distributed in said second clutch member; rolling members held in said aperture means and adapted to be engaged in said first recess means for placing said first and second clutch members in torque-transmitting engagement; a switching ring having therein second recess means corresponding to said first recess means and angularly offset relative thereto when said clutch is in torque-transmitting engagement; circumferentially acting spring means holding said switching ring in said angularly offset position; axial spring means acting against said switching ring to urge said rolling members into torque-transmitting engagement within said first recess means; said switching ring being rotatable against the force of said circumferentially acting spring means when a predetermined nominal torque of said clutch is exceeded to bring said second recess means in corresponding angular position relative to said aperture means; vibration protection means comprising securing pin means mounted in said first clutch member so as to be axially movable relative thereto to a limited extent, detent means formed in said switching ring for engaging therein said securing pin means when said clutch is in torque-transmitting engagement, and spring means urging said securing pin means into engagement with said detent means; said securing pin means extending into said detent means a distance smaller than the maximum depth of said second recess means to enable said securing pin means to be disengaged therefrom when said nominal clutch torque is exceeded; said vibration protection means preventing vibration-induced movement of said second recess means into corresponding angular position relative to said aperture means.

2. An overload clutch according to claim 1 wherein the width of said detent means in the circumferential direction of said clutch is greater than the diameter of said securing pin protruding into said detent means.

* * * * *